(12) United States Patent
Bouillet et al.

(10) Patent No.: US 8,779,949 B2
(45) Date of Patent: Jul. 15, 2014

(54) DE-NOISING SCHEDULED TRANSPORTATION DATA

(71) Applicant: International Business Machines Corporation, Armonk, NY (US)

(72) Inventors: Eric P. Bouillet, Englewood, NJ (US); Francesco Calabrese, Dublin (IE); Fabio Pinelli, Dublin (IE); Olivier Versheure, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/664,064

(22) Filed: Oct. 30, 2012

(65) Prior Publication Data

US 2014/0094991 A1    Apr. 3, 2014

Related U.S. Application Data

(63) Continuation of application No. 13/629,939, filed on Sep. 28, 2012.

(51) Int. Cl.
*G08G 1/123* (2006.01)

(52) U.S. Cl.
USPC ........... 340/994; 701/465; 701/414; 701/410; 701/411; 701/117; 340/539.13; 340/988; 180/168; 455/456.1; 455/456.3

(58) Field of Classification Search
None
See application file for complete search history.

(56) References Cited

U.S. PATENT DOCUMENTS

| | | | |
|---|---|---|---|
| 5,400,020 A | 3/1995 | Jones et al. | |
| 5,948,040 A | 9/1999 | DeLorme et al. | |
| 6,006,159 A | 12/1999 | Schmier et al. | |
| 6,580,998 B2 | 6/2003 | Flynn et al. | |
| 6,734,823 B2 * | 5/2004 | Mintz et al. | 342/463 |
| 7,603,281 B1 | 10/2009 | Miller et al. | |
| 7,914,100 B2 | 3/2011 | Kashimoto et al. | |

(Continued)

FOREIGN PATENT DOCUMENTS

| | | |
|---|---|---|
| CN | 101123515 B | 6/2010 |
| CN | 101388143 B | 4/2011 |

(Continued)

OTHER PUBLICATIONS

Ackerman, et al., "Single-Bit Correct, Double-Bit Detect Error Checking/Correction Scheme"; http://www.ip/com/pubview/IPCOM000112383D; Mar. 27, 2005.

(Continued)

*Primary Examiner* — Helal A Algahaim
*Assistant Examiner* — Paul Castro
(74) *Attorney, Agent, or Firm* — Cantor Colburn LLP

(57) ABSTRACT

Embodiments of the disclosure include a method for de-noising data in a scheduled transportation system, the method includes receiving a plurality of digital traces that correspond to a piece of equipment in the scheduled transportation system. The method also includes identifying a plurality of journeys from the plurality of digital traces, wherein each of the plurality of journeys corresponds to the piece of equipment traversing one of a plurality of routes and generating a route map and schedule for the scheduled transportation system from the plurality of journeys and the plurality of digital traces.

9 Claims, 3 Drawing Sheets

(56) References Cited

U.S. PATENT DOCUMENTS

| | | | |
|---|---|---|---|
| 8,050,949 B2 | 11/2011 | Purang et al. | |
| 8,284,076 B1* | 10/2012 | Horstemeyer | 340/994 |
| 2002/0002548 A1 | 1/2002 | Roundtree | |
| 2004/0199415 A1* | 10/2004 | Ho | 705/8 |
| 2006/0212187 A1* | 9/2006 | Wills et al. | 701/19 |
| 2006/0224426 A1 | 10/2006 | Goossens et al. | |
| 2008/0275643 A1 | 11/2008 | Yaqub et al. | |
| 2010/0205021 A1* | 8/2010 | Jewett et al. | 705/7 |
| 2010/0268447 A1 | 10/2010 | Griffiths | |
| 2010/0280750 A1 | 11/2010 | Chen et al. | |
| 2012/0010803 A1 | 1/2012 | Min et al. | |
| 2012/0226434 A1* | 9/2012 | Chiu | 701/117 |
| 2012/0253867 A1* | 10/2012 | Davidson | 705/7.12 |
| 2012/0290182 A1* | 11/2012 | Cooper et al. | 701/70 |
| 2013/0144517 A1* | 6/2013 | Kickbusch | 701/119 |
| 2013/0204525 A1 | 8/2013 | Pfeifle | |
| 2014/0012634 A1* | 1/2014 | Pearlman et al. | 705/7.42 |

FOREIGN PATENT DOCUMENTS

| | | | |
|---|---|---|---|
| JP | 2001222796 A | * | 8/2001 |
| WO | 2008060308 A2 | | 5/2008 |
| WO | 2011016901 A1 | | 2/2011 |
| WO | WO2011016902 A1 | | 2/2011 |

OTHER PUBLICATIONS

Damodaram, et al; "Error Detection and Correction Options for Data Services in B-ISDN"; Globecom '90: IEEE Global Telecommunications Conference and Exhibition; Commuications: Connection to the Future:; pp. 1751-1757; vol. 3; IEEE; 1990.

Kerrigan, et al.; "Error Correction Procedure to Correct One Hard and One Soft Error Using a Single Error Correcting Code"; htpp://www.ip.com/pubview/IPCOM000047387D; Feb. 7, 2005.

Litwin, et al; "Error Control Coding"; IEEE Potentials, vol. 20, No. 1, pp. 26-28, Feb.-Mar. 2001.

* cited by examiner

DE-NOISING SCHEDULED TRANSPORTATION DATA

CROSS-REFERENCE TO RELATED APPLICATION

This application is a continuation of U.S. patent application Ser. No. 13/629,939, filed Sep. 28, 2012, the disclosure of which is incorporated by reference herein in its entirety.

BACKGROUND

The present invention relates to data for a scheduled transportation system, and more specifically, to de-noising data collected for a scheduled transportation system.

Scheduled transportation systems are transportation systems in which one or more pieces of equipment follow one or more predefined routes and makes scheduled stops along the routes. Data corresponding to the scheduled transportation systems, includes, but is not limited to, route maps, schedules, geo-locations of scheduled stops, and the like. In many cases, the data corresponding to scheduled transportation systems can contain erroneous information. The erroneous information may come from a wide variety of sources including both planed and unplanned changes in the route map and schedules.

Currently, in scheduled transportation systems that have manually managed data, the data may become outdated or otherwise inaccurate due to a variety of reasons including the infrequency of the manual updates. In other systems that attempt to automatically update the data for the scheduled transportation systems, the data may be inaccurate due to errors and anomalies in the collected data.

Accordingly, what is needed is an automatic system and method of maintaining the data for scheduled transportation systems that can ensure the accuracy of the data provided.

SUMMARY

Embodiments include a method for de-noising data in a scheduled transportation system, the method includes receiving a plurality of digital traces that correspond to a piece of equipment in the scheduled transportation system. The method also includes identifying a plurality of journeys from the plurality of digital traces, wherein each of the plurality of journeys corresponds to the piece of equipment traversing one of a plurality of routes and generating a route map and schedule for the scheduled transportation system from the plurality of journeys and the plurality of digital traces.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

In exemplary embodiments, methods and systems for de-noising data for a scheduled transportation system are provided. The data may include both static information, such as road information, and dynamic information, such as scheduling information. In exemplary embodiments, the method and system are configured to both filter out incorrect information and add missing information regarding the scheduled transportation system. Furthermore, the method and system may be configured to account for uncertainty in the data for a scheduled transportation system and provide a confidence level associated with the data.

Figure 1:
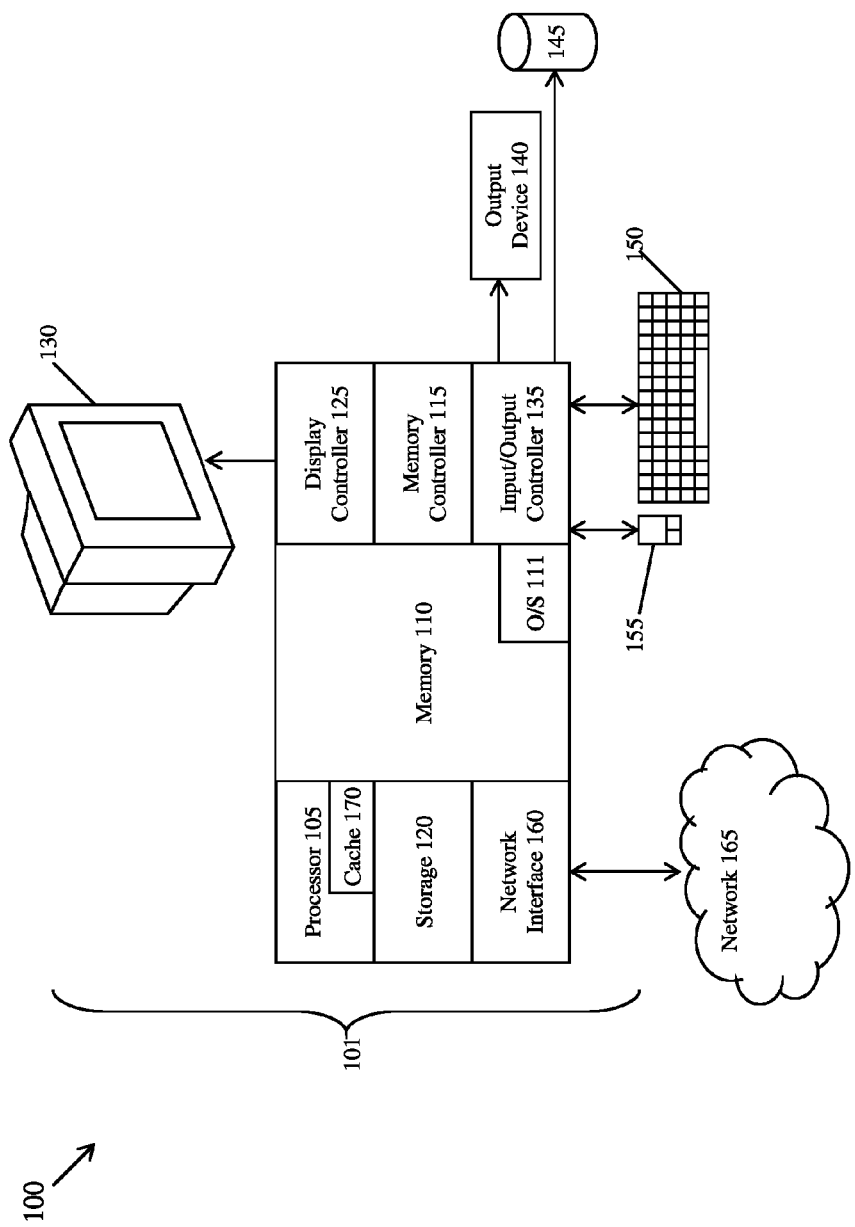
FIG. 1 illustrates a block diagram of a computer system for use in practicing the teachings herein.

FIG. 1 illustrates a block diagram of a computer system 100 for use in practicing the teachings herein. The methods described herein can be implemented in hardware, software (e.g., firmware), or a combination thereof. In an exemplary embodiment, the methods described herein are implemented in hardware, and may be part of the microprocessor of a special or general-purpose digital computer, such as a personal computer, workstation, minicomputer, or mainframe computer. The computer system 100 therefore includes general-purpose computer 101.

In an exemplary embodiment, in terms of hardware architecture, as shown in FIG. 1, the computer 101 includes a processor 105, memory 110 coupled to a memory controller 115, and one or more input and/or output (I/O) devices 140, 145 (or peripherals) that are communicatively coupled via a local input/output controller 135. The input/output controller 135 can be, for example but not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing hardware instructions or software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing instructions. The processor 105 includes a cache 170, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 170 may be organized as a hierarchy of more cache levels (L1, L2, etc.).

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processor 105.

The instructions in memory 110 may include one or more separate programs, each of which comprises an ordered listing of executable instructions for implementing logical functions. In the example of FIG. 1, the instructions in the memory 110 include a suitable operating system (OS) 111. The operating system 111 essentially controls the execution of other computer programs and provides scheduling, input-output control, file and data management, memory management, and communication control and related services.

In an exemplary embodiment, a conventional keyboard 150 and mouse 155 can be coupled to the input/output controller 135. Other output devices such as the I/O devices 140, 145 may include input devices, for example but not limited to a printer, a scanner, microphone, and the like. Finally, the I/O devices 140, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 100 can further include a display controller 125 coupled to a display 130. In an exemplary embodiment, the system 100 can further include a network interface 160 for coupling to a network 165. The network 165 can be an IP-based network for communication between the computer 101 and any external server, client and the like via a broadband connection. The network 165 transmits and receives data between the computer 101 and external systems. In an exemplary embodiment, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the instructions in the memory 110 may further include a basic input output system (BIOS) (omitted for simplicity). The BIOS is a set of essential routines that initialize and test hardware at startup, start the OS 111, and support the transfer of data among the hardware devices. The BIOS is stored in ROM so that the BIOS can be executed when the computer 101 is activated. When the computer 101 is in operation, the processor 105 is configured to execute instructions stored within the memory 110, to communicate data to and from the memory 110, and to generally control operations of the computer 101 pursuant to the instructions.

Figure 2:
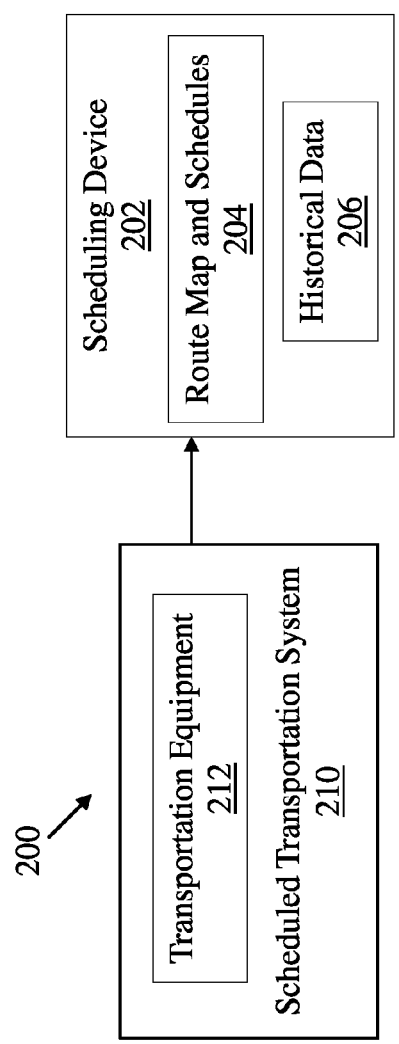
FIG. 2 illustrates a block diagram of a system for de-noising data in a scheduled transportation system in accordance with an embodiment.

Referring now to FIG. 2, a block diagram of a system 200 for de-noising data in a scheduled transportation system 210 in accordance with an embodiment is shown. As illustrated the system 200 includes a scheduled transportation system 210 having one or more pieces of equipment 212. The system 200 also includes a scheduling device 202 which includes route maps and schedules 204 and historical data 206 that correspond to the scheduled transportation system 210. In exemplary embodiments, the scheduled transportation system 210 may be a multi-modal transportation system that includes multiple types of equipment 212. The equipment 212 may include, but is not limited to, a bus, a train, a ferry, a subway car, or the like. In exemplary embodiments, the scheduling device 202 may be a computer similar to the one shown and described in FIG. 1.

In exemplary embodiments, the scheduling device 202 is configured to receive and store information received from the scheduled transportation system 210 regarding the state of the equipment 212. For example, the scheduled transportation system 210 may be configured to send the scheduling device 202 digital traces that include the location, timestamp and identification of the pieces of equipment 212. In exemplary embodiments, the scheduling device 202 stores the received digital traces as historical data 206 and periodically performs processing on the historical data 206 to create, or update, a route map and schedules 204.

In exemplary embodiments, the scheduling device 202 performs a process to de-noise data received from the scheduled transportation system 210. The process can include a variety of data mining techniques, statistical techniques and machine learning techniques. In exemplary embodiments, the historical data 206 includes both dynamic information and static information relating to the scheduled transportation system 210. In exemplary embodiments, the process includes applying a clustering algorithm on the historical data 206 to identify stops and applies a classification model to classify the identified stops. Once the stops have been identified and classified, the process includes mapping the scheduled stops onto the transportation network to de-noise scheduled transportation data by adding, removing and/or correcting the route maps and schedules 204.

Figure 3:
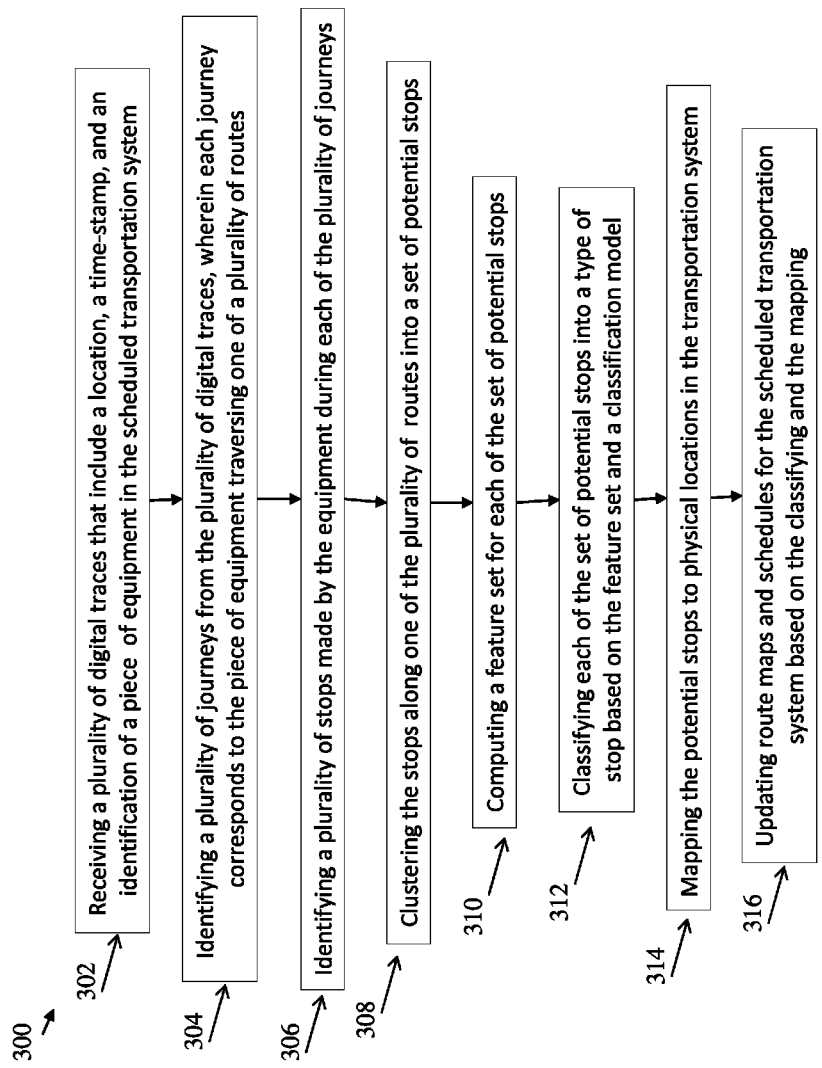
FIG. 3 illustrates a flow diagram of a method for de-noising data in a scheduled transportation system in accordance with an embodiment.

Referring now to FIG. 3, a flow chart illustrating a method 300 for de-noising data in a scheduled transportation system in accordance with an exemplary embodiment is shown. As shown at block 302, the method 300 includes receiving a plurality of digital traces that include a location, a timestamp, and an identification of a piece of equipment in the scheduled transportation system. Next, as shown at block 304, the method 300 includes identifying a plurality of journeys from the plurality of digital traces. As used herein, a journey is a trip by a piece of equipment along one of a plurality of routes in the transportation system. In exemplary embodiments, during the identification of the plurality of journeys observation errors in the digital traces may be discarded. Observation errors are errors which easily detectable and may be identified by a variety of means. For example, errors in a GPS location can be detected if the GPS location places the equipment a very large distance away from a previously known location in a very short period of time. The method 300 also includes identifying stops made by the equipment during each of the plurality of journeys, as shown at block 306. In exemplary embodiments, the stops of the equipment can be detected by a variety of known means and may include both scheduled stops and non-scheduled stops (e.g., traffic lights, junctions, etc.). In one embodiment, an accelerometer may be used to detect a stop by the equipment and a digital trace may be generated in response to the determination that the equipment has stopped.

Continuing with reference to FIG. 3, as shown at block 308, the method 300 includes clustering the stops along one of the plurality of routes into a set of potential stops. Next, as shown at block 310, the method 300 includes computing a feature set for each of the set of potential stops. As shown at block 312, the plurality of a feature sets are classified into types of stops based on the feature set and a classification model. In exemplary embodiments, the classification model may be based on a partial ground truth, which is a known location of scheduled stops for a selected route. Next, as shown at block 314, the classified stops are mapped to physical locations in the transportation system. Finally, as shown at block 316, the route maps and schedules for the scheduled transportation system are updated based on the classified stops and the digital traces.

In exemplary embodiments, all of the stops along a route that are performed by different vehicles on different days and on different times during the day are grouped into clusters. Since vehicles in a scheduled transportation system typically stop at the same locations along a route, a clustering algorithm can be used to detect where the most common stops are for each route. In exemplary embodiments, each cluster represents a potential stop and is characterized by a feature set including spatial, temporal and statistical features that describe the cluster. For example, the cluster may include an average stop time, a standard deviation of the stop time, the stop location, the average stop duration, and the like.

In exemplary embodiments, different feature sets, or combinations of features, describe different types of clusters and indicate a type of stop such as scheduled stops and non-scheduled stops. Accordingly, a classification algorithm can be applied to identify the types of stops based on the feature set that describes each cluster. In addition, a ground truth can also be used by the classification algorithm in classifying the clusters.

In exemplary embodiments, the classification of each cluster to a type of stop may include a confidence level that indicates how likely the cluster in fact represents the identified type of stop.

Once all of the identified stops are classified, the classified stops can be used to correct erroneous data included in the route map and schedules for the scheduled transportation system. The correction can include rectification of erroneous data and removing and adding information from the route map and schedule. For example, some of the scheduled stops may not be included on the previous schedule. The correction may be implemented by using a map matching algorithm and the confidence level associated with all the identified stops.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for de-noising data in a scheduled transportation system, the method comprising:
   receiving by a processor, a plurality of digital traces that correspond to a piece of equipment in the scheduled transportation system, wherein each of the plurality of digital traces are generated based on a determination that the corresponding piece of equipment has stopped;
   identifying by the processor a plurality of journeys from the plurality of digital traces, wherein each of the plurality of journeys corresponds to the piece of equipment traversing one of a plurality of routes;
   identifying by the processor a plurality of stops made by the piece of transportation equipment during each of the plurality of journeys;
   classifying by the processor, each of the plurality of identified stops into a type of stop, said classifying comprising:
   clustering by the processor, the plurality of stops along one of the plurality of routes into a set of potential stops;
   computing by the processor, a feature set for each of the set of potential stops; and
   classifying by the processor, each of the set of potential stops into the type of stop based on the feature set and a classification model, wherein the type of stop comprises at least one of a scheduled stop and a non-scheduled stop;
   identifying by the processor, a route map comprising at least a portion of the plurality of identified stops;
   identifying by the processor, a schedule for the scheduled transportation system; and
   updating by the processor, the route map and the schedule for the scheduled transportation system from the plurality of journeys and the plurality of digital traces.

2. The method of claim 1, wherein each of the plurality of digital traces comprises a location, a time-stamp, and an identification of the piece of equipment in the scheduled transportation system.

3. The method of claim 1, wherein classifying each of the set of potential stops includes calculating a confidence level.

4. The method of claim 1, wherein the classifying comprises applying a partial ground truth.

5. The method of claim 1, wherein the identification of the schedule includes the identification of the arrival times of the piece of transportation equipment at scheduled stops.

6. The method of claim 1, wherein updating the route map and schedule includes removing one or more scheduled stops from the route map and schedule.

7. The method of claim 1, wherein updating the route map and schedule includes adding one or more scheduled stops to the route map and schedule.

8. The method of claim 1, wherein updating the route map and schedule includes correcting a characteristic of one or more scheduled stops of the route map and schedule.

9. The method of claim 8, wherein the characteristics of a scheduled stop include at least one of a location, a list of lines serving the scheduled stop, a time of arrival of vehicles at the scheduled stop.

* * * * *